Nov. 24, 1931.         S. B. LINDLEY         1,833,028
MEASURING AND DISPENSING APPARATUS FOR CANS AND THE LIKE
Filed July 18, 1928
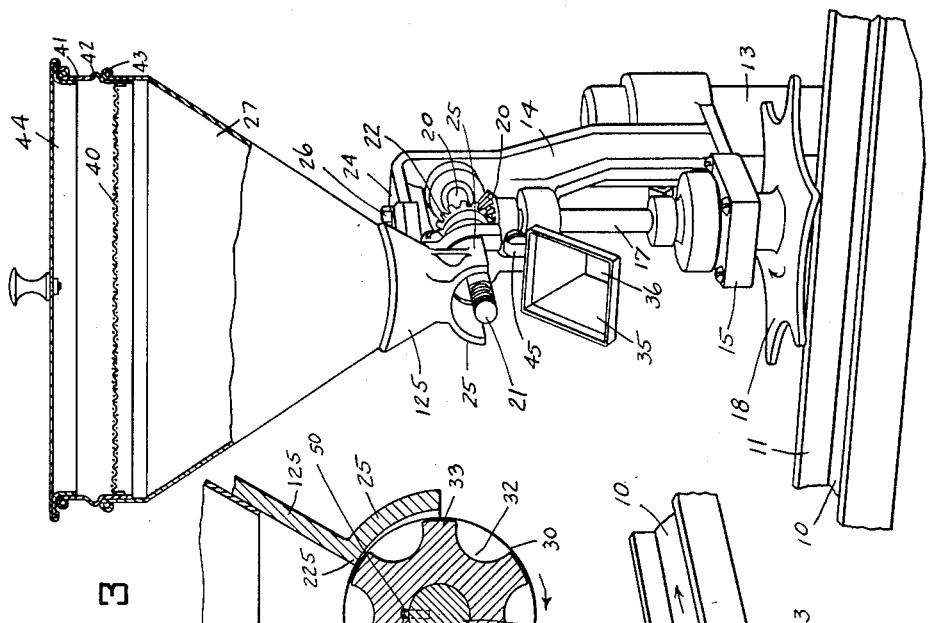
INVENTOR.
STACEY B. LINDLEY
ATTORNEYS.

Patented Nov. 24, 1931

1,833,028

UNITED STATES PATENT OFFICE

STACEY B. LINDLEY, OF INDIANAPOLIS, INDIANA, ASSIGNOR TO INDIANA CANNING MACHINERY COMPANY, OF INDIANAPOLIS, INDIANA, A CORPORATION OF INDIANA

MEASURING AND DISPENSING APPARATUS FOR CANS AND THE LIKE

Application filed July 18, 1928. Serial No. 293,637.

This invention relates more particularly to an apparatus for measuring and dispensing condiment to moving cans and the like, such as salt or other condiment or material. It has been primarily developed as a salter in canning vegetables or the like, for introducing into each can a measured quantity of salt or the like condiment.

One feature of the invention is a rotary measuring cylinder having pockets in the periphery thereof with certain predetermined dimensions, associated with a hopper for containing the salt, condiment or other material so that by gravity said material will enter and fill the pockets in the measuring cylinder. Said measuring cylinder, or at least the upper half thereof, operates in a cylindrical cover or hood at the bottom of the hopper arranged to cooperate with the measuring cylinder for striking off the salt or the like from the top of the cylinder so that the pockets thereof will contain a uniform quantity, and also for the purpose of retaining the salt or other condiment in the pockets of the cylinder until it has revolved far enough to be discharged by gravity. This arrangement is effected by the cylinder being located above the center of the curvature of the internal surface of said cover or hood so that the grains of salt or the like will not lodge between the cylinder and the cover or hood and choke the same, or create frictional resistance to the operation of the measuring cylinder.

Another feature of the invention is the combination of a hopper, an outlet hood therefor, a measuring cylinder rotating in said hood, and a rotary shaft upon which the measuring cylinder is mounted so that it can be readily released and withdrawn over the end of said shaft and another cylinder with pockets of different dimensions but of the same diameter can be replaced.

Another feature of the invention consists in combining the subject matter of the foregoing paragraph with a discharge receptacle with substantially a rectangular upper end and tapering downward to a reduced outlet and hinged so as to be readily moved into and out of position to receive the salt or other material from the measuring cylinder and discharge it into a can or the like below.

Another feature of the invention consists in controlling the operation of said device by the can or the like while being moved by a conveyor under the measuring and dispensing funnel and gear means for operating the measuring cylinder that is actuated by a horizontal star wheel engaged with a moving can so that the material will be discharged when the can is under the dispensing funnel.

Another feature of the invention consists in the construction of the device so that it will operate with the conveyor moving in either direction. This enables the device to be located at either side of the conveyor as may be most convenient.

The full nature of the invention will be more clearly understood from the accompanying drawings and the following description and claims:

In the drawings Fig. 1 is a view with the hopper in side elevation and the rest of the apparatus in perspective view with parts being broken away. Fig. 2 is a perspective view of what is shown in Fig. 1, the cans being omitted, and the upper part of the hopper in section and the dispensing funnel in open and downward position with the measuring cylinder removed. Fig. 3 is a central vertical section through the measuring cylinder, its shaft, its cover or hood and the lower part of the hopper. Fig. 4 is a perspective view of the measuring cylinder.

There is shown in the drawings a horizontal conveyer 10 moving in the direction indicated by the arrow longitudinally of the conveyor support 11 and adapted to convey cans 12 or the like vessels which are open at the top. Support 11 for the conveyor has side bars which prevent the cans escaping from the conveyor.

A substantial post 13 is mounted vertically at the side of the conveyor and carries a heavy metal bracket 14 which has a horizontal bearing plate 15 below and a bearing arm 16 above for mounting a vertical shaft 17, on the lower end of which a star wheel 18 is secured immediately over and to one side of the conveyor. The periphery of the star wheel is provided with a series of curved indentations that project over the conveyor into position to receive a can as it is moving along, the curvature of said indentations being substantially the same as that of the can, so that, as the can moves with the conveyor, it rotates the star wheel 18.

On the upper end of the shaft 17 there is a bevel gear 20, and above it, a horizontal shaft 21 having a bevel gear 22 meshing with the gear 20. One end of the shaft 21 is mounted in the vertical portion of the bracket 14 and the other end in a bearing 23 at the end of the bearing arm 16 and on the underside of the top arm 24 of the bracket 14. The other end of the shaft 21 projects under a cover or hood 25 secured to the bracket 14 by the cap screws 26 and support the hopper 27 above it.

A measuring cylinder 30 is provided with a central bore 31 so that it can be slipped on the end of the shaft 21 and held on by a nut not shown. The measuring cylinder has a series of pockets 32 in the periphery thereof. There are six of said pockets shown in Fig. 3, equi-distant from each other and with the ribs 33 between said pockets provided with an external curvature cylindrically disposed as shown. The ends of the pockets are closed by the cylindrical ends of the cylinder as shown in Fig. 4. These pockets on each cylinder are of uniform dimensions and a machine of this kind is supplied with a number of such cylinders of the same diameter but with pockets of varying dimensions by reducing the length or depth thereof so that the volume of material carried by the pockets may be varied, if desired, by replacing said cylinders.

The hopper 27, at its lower end, fits into the upwardly-extending portion 125 of the cover or hood 25, through which the condiment passes from the hopper by gravity and fills the upper pocket of the cylinder. The cylinder is rotated and each pocket will be filled by gravity in succession. The hood or cover 25 covers or protects substantially the upper half of the measuring cylinder 30 and the internal curvature thereof is slightly greater than the external curvature of the measuring cylinder so that the center of curvature of the internal surface is slightly below the axis of the shaft 21 or the center of curvature of the measuring cylinder; and the measuring cylinder is set up in said hood or the like so that the inner corners 225 thereof fit rather snugly against the measuring cylinder to serve as striking off edges in order to strike off the surplus material entering the upper pocket of the cylinder so that all of said pockets will receive the same amount of material.

But, as the cylinder turns from said striking off edge or edges 225, there is increasing clearance between the hood 25 and the cylinder, whereby salt or the like will not lodge between them and choke the same, and the upper surface of the salt or the like will be free from the hood until it discharges. This is an important feature of the invention in order that the operation of the machine may be continuous and practical without choking. The crystals of salt or the like are extremely hard and angular. In the case of salt, the crystal is truly cubical so that there should be no layer of salt between the surface 33 of the cylinder rib and the cover 25, except where the clearance space is so large that the salt will not become jammed between the measuring cylinder and the hood 25. Hence, the striking off portion 225 of the hood should fit rather snugly against the surface 33 of the cylinder. In practice, this arrangement has proven very successful and free from any tendency to choke the machine.

When the pocket of the measuring cylinder has turned down far enough in the rotation thereof, it discharges the contents into a dispensing funnel 35 which is located under but spaced from the lower part of the hood 25, as seen in Fig. 1. The upper end of this funnel is rectangular preferably, and the funnel faces downward with a rectangular outlet, as at 36, which directs salt or the like into the open upper end of the can 12 immediately under it.

It is thus seen that when a can is moved by the conveyor to position under the salter or the like, it will have moved the star wheel in the direction of the arrow sufficiently far to cause a discharge of the salt or the like from one pocket 32 of the measuring cylinder. This process is continued and repeated so that as each time a can comes beneath the salter, it will receive its quota of condiment. But, if there are no cans on the conveyor, or if a can is skipped, the star wheel will not be turned and the device will not be operated or the condiment discharged. This automatically avoids any waste.

The upper part of the hopper 27 contains a sieve or sifter 40. This sieve is located in the cylinder or ring 41 which has an external bead 42 adapted to fit on the bead 43 at the top of the hopper. A lid 44 is removably mounted on the top of the sifter rim 41 and the sifter is readily removable from the top of the hopper. This enables sifters of various mesh to readily replace each other and, when in place, the material in the hopper is discharged by pouring material on the sifter so as to prevent coarse or foreign material from entering the hopper. Then the lid 44 is placed upon the receptacle.

In order to vary the discharge of the measuring cylinder, the dispensing funnel 35 is hinged at 45 to the bearing arm 16, as seen in Fig. 1, so that it can be dropped down from the position shown in Fig. 1 to that shown in Fig. 2. Then the measuring cylinder is removed and another with pockets of different dimensions is put in its place.

The measuring cylinder is splined internally at 50 to engage the pin 51 in the shaft 31 and cause the measuring cylinder to properly register always with the star wheel.

The invention claimed is:

1. Measuring and dispensing apparatus for charging moving cans or the like, including a hopper tapering downwardly, a horizontally disposed vertically rotatable measuring cylinder having longitudinally-extending measuring pockets in the peripheral surface thereof, and a member between said measuring cylinder and the lower end of said hopper having an upper portion adapted to receive material from the hopper and tapering downward to the outlet thereof and to the measuring cylinder, and the lower portion being a horizontally-extending hood substantially semi-circular in cross section for covering the measuring cylinder with a close contact between said measuring cylinder and said hood at said outlet and with a gradually increasing clearance from the upper part to the lower part of the hood.

2. Measuring and dispensing apparatus for charging moving cans and the like, including a conveyor for moving cans, a frame mounted beside said conveyor, a vertical shaft in said frame, a star wheel secured on the shaft and extending over the conveyor in the path of the moving cans, a horizontal shaft in said frame and driven by said vertical shaft, a measuring cylinder adapted to be fitted on said shaft and having peripheral measuring pockets, a hood-like cover for the upper part of said measuring cylinder, a hopper discharging into said hood-like cover, and a funnel pivoted at one side to said frame so as to be movable to horizontal position under said measuring cylinder in position to receive the material therefrom and spaced therefrom to permit the discharge of the material from the cylinder throughout substantially a half revolution thereof and movable away from said cylinder to permit the ready removal of said cylinder from said horizontal shaft and replacement of a cylinder thereon, substantially as set forth.

In witness whereof, I have hereunto affixed my signature.

STACEY B. LINDLEY.